United States Patent [19]

Cho

[11] Patent Number: 5,776,334
[45] Date of Patent: Jul. 7, 1998

[54] ELECTRONIC SCALE REDUCTION TECHNIQUE

[75] Inventor: Young I. Cho, Cherry Hill, N.J.

[73] Assignee: Electronic Descaling 2000, Inc., Boothwyn, Pa.

[21] Appl. No.: 736,230

[22] Filed: Oct. 24, 1996

[51] Int. Cl.$^6$ .................................................. C02F 1/48
[52] U.S. Cl. .................. 210/138; 210/222; 210/243; 204/155; 335/209
[58] Field of Search ..................... 210/222, 223, 210/695, 243; 204/155; 335/209

[56] References Cited

U.S. PATENT DOCUMENTS 5,074,998  12/1991  De Baat Doelman .................. 210/222
5,514,283  5/1996  Stefanini ............................... 210/695

*Primary Examiner*—David A. Reifsnyder
*Attorney, Agent, or Firm*—Robert S. Lipton, Esq.; Lipton, Weinberger & Husick

[57] ABSTRACT

For producing controlled precipitation in fluid flowing through a pipe, a coil of electric wire, of flat, generally rectangular spiral shape, is sandwiched between flexible cover sheets. The resulting assembly is applied to the outer circumference of the pipe, with the lengthwise dimension of the coil extending perpendicularly to the flow inside the pipe. A time-varying electric current is applied to the coil to produce a corresponding magnetic field. This, in turn, causes induction which produces the controlled precipitation.

16 Claims, 2 Drawing Sheets

ELECTRONIC SCALE REDUCTION TECHNIQUE

BACKGROUND OF THE INVENTION

The present invention relates to the reduction and remediation of "scale" formation inside pipes or vessels which carry water or other fluids. More particularly, the invention relates to apparatus and techniques for performing the above-mentioned functions through the use of electronically produced magnetic and electric fields.

Scale formation is a serious problem, both in industry and in residential situations. The reason is that most fresh water in the United States can be regarded as "hard." Hard water contains calcium and other dissolved minerals, such as magnesium, which can and in fact do deposit on the interior of pipes and other vessels carrying this water. In so doing, the deposits restrict flow or reduce vessel capacity. Especially when the water is used in a heat transfer situation (e.g. a boiler), these deposits have the further deleterious effect of reducing the efficiency of the heat transfer. This reduction can be very costly, causing as much as 70% of the overall cost of the heating fuel to be wasted.

One way to cope with this problem has been to remove these scale deposits by procedures such as sand blasting, acid cleaning, or mechanical scraping. However, these procedures generally require at least some disassembly of the equipment in which the scale deposits had formed, with consequent interruption in the operation of that equipment, in addition to the cost of the procedures themselves. In many cases, these drawbacks made such procedures altogether impractical.

It is known that scale formation can also be treated without using such physically invasive procedures.

In particular, it is known to wrap wire into an elongated coil surrounding a segment of the pipe, upstream from the location where the scale deposits would normally form, and to pass a time-varying electric current through that coil. This current creates a time-varying magnetic field inside the pipe. That magnetic field in turn causes induction and this induction produces an effect which, in connection with the present invention, is called "controlled precipitation".

More particularly, in scale formation, supersaturated mineral ions (such as calcium) in the water combine with counter-ions (such as bicarbonate) and then precipitate out of solution and deposit on scale-susceptible surfaces.

One way to counteract the formation of such scale deposits is to control the type of crystal structure resulting from the precipitation mentioned above. For example, calcium carbonate precipitates are capable of assuming two predominant crystal structures. One of these types floats in solution and can be carried away by the fluid flow; the other type tends to cling to the lateral pipe surfaces and/or to sink to the bottom and hence accumulates to form the undesired deposits.

Controlled precipitation is achieved by forming, upstream of the region of the potential scale deposits, seed crystals of the above-described type which float in solution. These seed crystals cause subsequent mineral carbonate precipitates of the same type to grow around them. These precipitates then pass through the (downstream) region of potential scale deposits without causing the (undesired) formation of such deposits.

As previously noted, a known technique for effecting controlled precipitation involves wrapping an induction coil around the above-mentioned upstream portion of the pipe and energizing this coil with a time-varying electric current. This current in the induction coil creates a time-varying magnetic field inside the pipe and that field, in turn, causes induction which then in turn produces the desired controlled precipitation.

This known technique is highly effective in dealing with undesired scale formation, but there are also situations in which its implementation is problematic.

For example, there are installations in which the diameter of the piping around which the induction coil would need to be wound is so large (as much as 84 inches in some electric power generating plants) that it would be impractical to wrap the required induction coil around its outer circumference.

As another example, there are installations in which the piping is in such tight quarters, or so close to other equipment, that it would again be impractical to wrap the turns of the induction coil around its outer circumference.

Also, the piping is sometimes hot, or located at such a height that it would be downright dangerous to attempt to wrap the necessary coil around it.

Accordingly, it is an object of the present invention to provide apparatus for producing, inside a pipe, an electromagnetic field for carrying out controlled precipitation, and which is free from at least one of the drawbacks of the prior art.

It is another object to provide such apparatus which is not subject to limitations due to piping diameter.

It is another object to provide such apparatus which is not subject to limitations due to the piping being in close quarters, or very close to other equipment.

It is another object to provide such apparatus which is not subject to limitations due to dangers in its utilization.

It is another object to provide a technique for utilizing the above-identified apparatus to achieve controlled precipitation, in the face of obstacles due to large piping sizes and/or difficult or dangerous circumstances.

BRIEF DESCRIPTION OF THE INVENTION

These and other objects which will appear are achieved in accordance with the present invention as follows.

Instead of winding a wire around the pipe in order to form an elongated induction coil, a coil of wire is formed in a substantially planar, spiral-like configuration. This flat, spiral-shaped coil is preferably attached to a correspondingly flat support surface, such as a flexible sheet of plastic or nonferrous metal. To protect the coil from damage, it is preferably overlaid with another such flexible sheet. Thus there is created a sandwich-like assembly of flat, spiral shaped wire, flanked by cover sheets. This assembly is thin (typically only fractions of an inch in thickness). It is also flexible, since both the wires and their cover sheets are chosen so as to be inherently flexible.

The turns of the spiral are preferably not round (or almost round), but are all elongated in the same direction, so as to form a coil of generally rectangular, or race track configuration, with a wire-free central portion extending lengthwise of the rectangle.

This flat, generally rectangular coil assembly is then applied to the outside of the pipe segment in which the desired controlled precipitation is to be achieved.

In so doing, the assembly is positioned so that its lengthwise dimension extends circumferentially with respect to the pipe; in other words, substantially at right angles to the fluid flow inside the pipe.

When the coil in such an assembly is energized by a time-varying electric current, the desired controlled precipitation takes place in the water flowing through the pipe.

The sandwich-like assembly of flat spiral coil between cover sheets in accordance with this invention can be made of sufficient size to work as intended even with large-diameter pipes. By virtue of its thinness and inherent flexibility, it can readily be applied to pipes in restricted locations. When so applied, it can be held in place either by adhesive on the exposed surface of one of the plastic sheets, or by ordinary cable ties or other clamps surrounding the sandwich and any portions of the pipe circumference not covered by the sandwich.

BRIEF DESCRIPTION OF THE DRAWINGS

For further details, reference is made to the discussion which follows, in light of the accompanying drawings, wherein.

The same reference numerals are used in the several figures to designate corresponding elements.

DETAILED DESCRIPTION OF THE PREFERRED EMBODIMENTS

Figure 1:
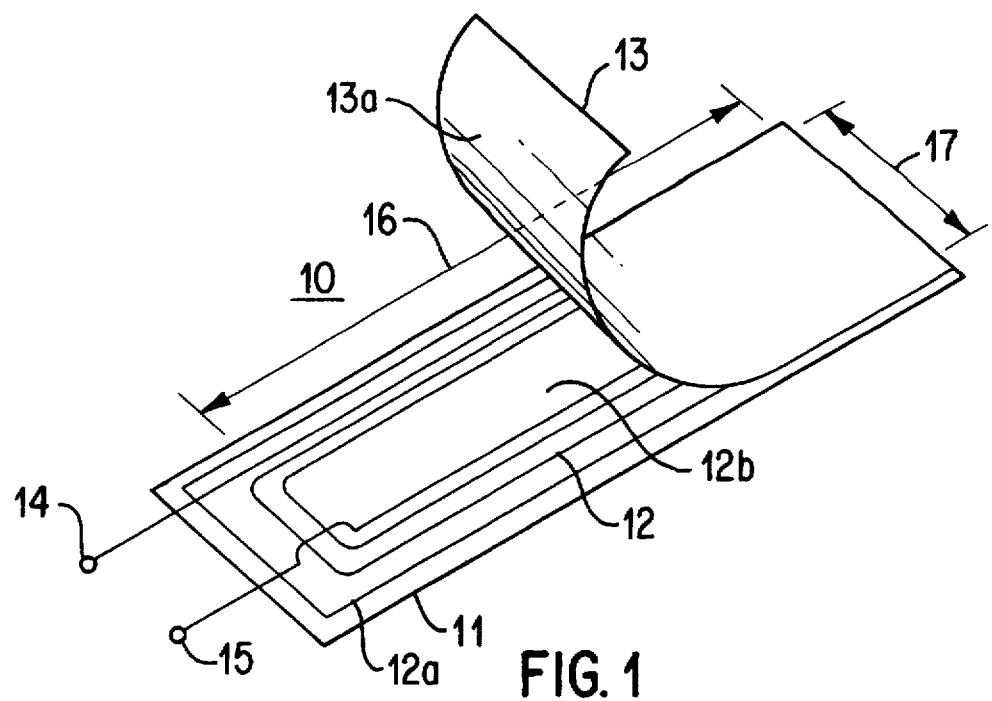
FIG. 1 is a diagrammatic illustration of a sandwich-like structure embodying the present invention.

Referring now to FIG. 1, this shows a sandwich-like assembly 10 of support sheet 11, flat spiral wire coil 12 and cover sheet 13. In this illustration, the cover sheet 13 has been shown partially peeled back in order to provide a clearer picture of the sandwich-like construction of assembly 10. In a real finished assembly, this cover sheet 13 overlies coil 12, and also support sheet 11 where that support sheet is not itself overlaid by the coil 12.

Coil 12 is preferably attached to support sheet 11 by means of a tape 12a underlying the coil and coated with adhesive on both faces. Likewise, coil 12 is attached to cover sheet 13 by having the latter's face 13a coated with adhesive. Adhesive tape 12a should have surface dimensions slightly greater than those of the flat, spiral coil, but smaller than the surface dimensions of the respective support and cover sheets 11 and 13.

The two ends of coil 12 are brought out to terminals 14 and 15, for connection to the electric circuitry (not shown) which is used to energize the coil 12.

As can be seen from FIG. 1, the coil 12 has a generally rectangular configuration, with a long dimension (or length) 16 and a short dimension (or width) 17. The corners of the rectangle are somewhat rounded, consistent with the bending characteristics of the electrical wire of which the coil 12 is formed. Preferably, this wire is itself insulated, to prevent shorting between adjacent turns of the coil, and also to enable the innermost end of the spiral to be brought out to terminal 15 across the other turns of the coil 12.

The wire of which coil 12 is made is preferably of the stranded variety, rather than solid core. This is so that the wire will be relatively flexible, both in order to form the desired bends at the four corners of the rectangular coil, and to facilitate flexing of the entire assembly 10 when being applied to a pipe in accordance with the invention.

It will be understood that the number of turns and the specific geometry of spiral coil 12, shown in FIG. 1, are purely illustrative. In a practical embodiment, there may be many more turns, and they may be much closer to each other than shown in FIG. 1. Indeed, adjacent turns may touch each other, the wire being insulated as noted above.

As can be seen in FIG. 1, a wire-free space 12b extends lengthwise of coil 12 between the legs of the innermost turn of the coil.

Figure 2:
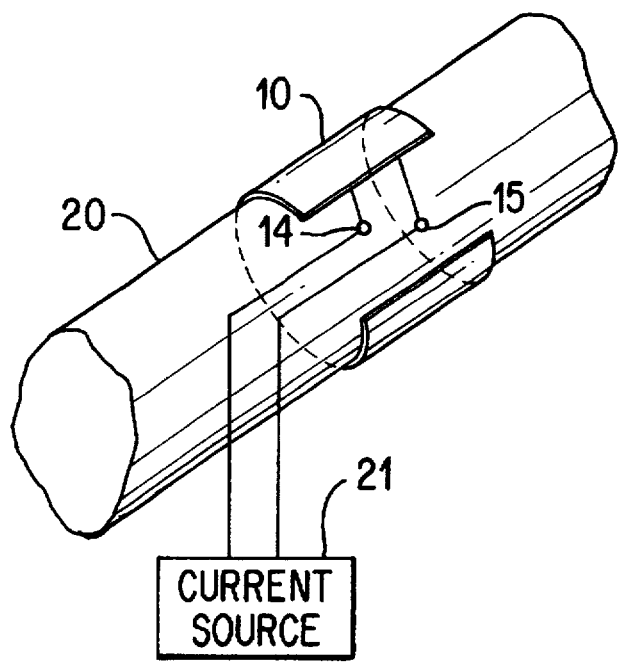
FIG. 2 is a diagrammatic illustration of the embodiment of FIG. 1, applied to a pipe segment in accordance with the present invention.

Turning now to FIG. 2, this shows how the structure of FIG. 1 is utilized in accordance with the invention. As shown in that figure, the sandwich-like assembly 10 is placed around the outside of pipe 20 (shown in fragmentary representation in FIG. 2). This pipe 20 is traversed by the water whose scale forming effect is to be treated in accordance with the present invention.

As shown in FIG. 2, the assembly 10 preferably surrounds most of the circumference of pipe 20. Indeed, the opposite ends of assembly 10 may actually touch, or even overlap. However, in that event, the coil 12 inside assembly 10 should still not be of such length that its opposite ends would overlap, because such overlap would cause opposing magnetic fields to be induced in pipe 20 from the overlap region. This would reduce the over-all effectiveness of the induction created by the magnetic field in producing controlled precipitation within pipe 20.

In FIG. 2, the opposite ends of assembly 10 are shown separated by an appreciable distance. However, this showing is only to enable clear illustration of the external connections to coil 12, including terminals 14 and 15. In actuality, these opposite ends of assembly 10 are preferably brought as close as practical to each other, but without coil overlap, as discussed above.

In FIG. 2, terminals 14 and 15 are shown connected to electric current source 21. This source 21 represents the circuitry which energizes the coil 12 to produce controlled precipitation inside pipe 20. The characteristics and operation of circuitry suitable for this purpose are known and are therefore not further discussed herein. For example, reference is made in this regard to copending U.S. patent application Ser. No. 08/544,156, filed Oct. 17, 1995, now U.S. Pat. No. 5,725,778 and assigned to the assignee of the present invention. Reference is also made to copending U.S. application Ser. No. 08/544,926, now U.S. Pat. No. 5,577,064 filed Oct. 17, 1995 and also assigned to the assignee of the present invention. Each of these copending applications discloses details of circuitry suitable for use as current source 21 in FIG. 2. Their contents are therefore incorporated in the present specification by reference, as fully as if set forth at length herein.

As previously noted, the assembly 10 may be secured to pipe 20 by adhesive (not visible in FIG. 2) on the surface of support sheet 11 which faces away from coil 12 and toward the pipe. It is that (outer) adhesive surface by means of which assembly 10 is then retained against pipe 20.

Figure 3:
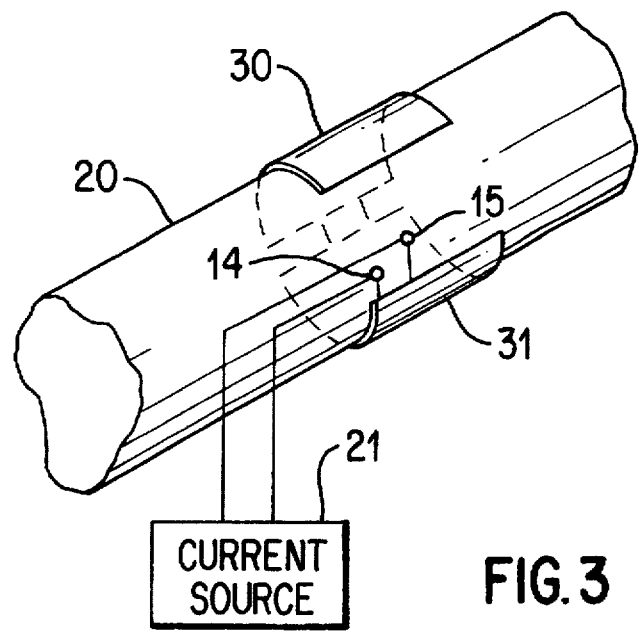
FIG. 3 is a diagrammatic illustration of another embodiment of the invention, utilizing a plurality of structures such as those of FIGS. 1 and 2.

Turning now to FIG. 3, this shows another embodiment of the invention, using more than one sandwich-like assembly similar to assembly 10 in FIG. 1.

Specifically, FIG. 3 shows two such assemblies, designated by reference numerals 30 and 31, positioned as shown with respect to the circumference of pipe segment 20. Each individual assembly 30 and 31 may be of the same general construction as assembly 10 in FIG. 1, including a generally rectangular spiral coil similar to coil 12 shown in FIG. 1, and each is attached to the circumference of pipe 32 in the same manner and with the same orientation as for assembly 10 in FIG. 2, namely with its lengthwise dimension perpendicular to the flow in pipe 20.

Assemblies 30 and 31 are preferably so dimensioned that, when applied to pipe 20, they combine to encircle most of the circumference of the pipe. In FIG. 3, the adjacent ends of the separate assemblies 30 and 31 are shown spaced apart from one another. In practice, those ends are preferably quite close to each other.

Preferably, the two separate assemblies 30 and 31 have the same external and internal constructions and dimensions and are positioned symmetrically around the circumference of pipe 32.

Figure 4:
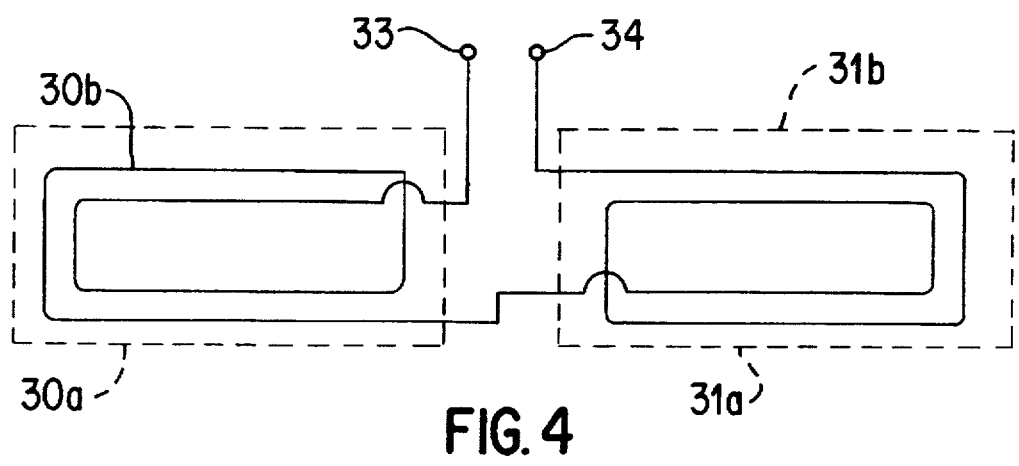
FIG. 4 is a simplified illustration useful in explaining the functioning of the embodiment of FIG. 3.

Referring now to FIG. 4, this shows, in highly simplified diagrammatic form, the electrical connections of assemblies 30 and 31. Specifically, broken-line rectangles 30a and 31a respectively represent the flat rectangular outlines of assemblies 30 and 31 (FIG. 3).

Coils 30b and 31b are simplified diagrams of the flat spiral coils within assemblies 30 and 31, respectively. In FIG. 4, only two turns are shown for each coil, but it will be understood that this is for explanation only; multiple turns will normally be used in a practical embodiment.

From FIG. 4, it is believed to be apparent that if a current is supplied from source 21 (FIG. 3) to terminals 33, 34 so that this current circulates clockwise in coil 31b, the current will also circulate clockwise in coil 30b. Ditto for counter-clockwise circulation of current in coils 31b and 30b.

As a result, when assemblies 30 and 31 are attached to pipe 32 as shown in FIG. 3, the magnetic fields created inside pipe 32 by both assemblies will have the same orientation with respect to the interior of the pipe and their effects will therefore reinforce each other.

Successful embodiments of the sandwich-like assemblies embodying the present invention have been constructed with the following ranges of parameters for the spiral coil 12 (FIG. 1):

| Length 16 | 12 inches to 42 inches |
| Width 17 | 12 inches |
| Number of turns | 25 to 50 |
| Wire size | 14 gauge to 18 gauge |
| Width of space 12a | 4 inches |

It will be understood that still other variations will occur to those skilled in the art, without departing from the inventive concept. For example, more than two separate assemblies like those in FIGS. 1 to 3 can be placed around the pipe circumference. These should then be interconnected so that the current in all of them circulates in the same direction, and therefore produces magnetic fields of the same orientation with respect to the interior of the pipe.

As previously mentioned, if adhesive attachment of the assembly to the pipe is not appropriate, mechanical attachment can be used, as by wrapping so-called cable ties around the outside of the one or more assemblies. This would be especially appropriate if there is very little space between the pipe to be equipped with an assembly embodying the invention and adjacent equipment. In that case, the assembly may have to be slid into position through a narrow gap, and adhesive on the side facing the pipe could interfere with that sliding movement.

In view of all the foregoing, it is desired that the scope of the invention be limited only by the appended claims.

What is claimed is:

1. An apparatus for use in reducing scale formation inside a vessel having an outer surface and adapted to contain flowing fluids, said apparatus comprising:

a coil formed from a length of wire having opposite ends, each end being adapted to be connected to an electrical source, said wire, when placed on a substantially flat surface forming concentric rectangles having long and short legs; and said coil being adapted to be applied and secured to said vessel so that said long legs of said coil are substantially perpendicular to the direction of the fluid flowing through the vessel.

2. The apparatus of claim 1 which includes inner and outer cover sheets disposed on opposite sides of said coil.

3. The apparatus of claim 2 wherein a tape coated with adhesive on both sides is located between the coil and the inner cover sheet.

4. The apparatus of claim 3 wherein the side of the outer cover sheet which faces the coil is coated with adhesive.

5. The apparatus of claim 2 including a plurality of said sandwich-like structures, wherein the coils of the respective structures are so connected to each other so that current applied to the ends of the wire circulates in the same direction in all the coils.

6. The apparatus of claim 5 further comprising means for supplying to said wire ends a time-varying electric current for producing controlled precipitation in said fluid.

7. The apparatus of claim 1, wherein the structure is sufficiently flexible enough to be conformed to the outer surface of said vessel.

8. The apparatus of claim 1, wherein the coil is in the shape of a race track.

9. The apparatus of claim 8 wherein the race track shape has long, substantially straight sides and short, substantially straight ends.

10. The apparatus of claim 9 wherein the corners formed by said sides and ends are rounded consistently with the bending capability of the electrical wire.

11. The apparatus of claim 1 wherein there is a space which is free of said wire, extending lengthwise of the coil between the legs of its innermost turn.

12. The apparatus of claim 1 applied to the outer surface of the vessel.

13. The apparatus of claim 12 wherein the dimensions of the coil's longer legs are such that it encompasses the major length of said outer surface perpendicular to the fluid flow vessel.

14. The apparatus of claim 13 wherein said coil dimensions are such that its opposite ends do not overlap when the apparatus is applied to said vessel.

15. The apparatus of claim 12 further comprising means for supplying an electric current to said coil.

16. The apparatus of claim 15 wherein said current is time-varying so as to produce controlled precipitation in said fluid.

* * * * *